(12) United States Patent
Jan

(10) Patent No.: US 11,009,052 B2
(45) Date of Patent: May 18, 2021

(54) DEVICE AND METHOD FOR AUGMENTING AIR MASS FLOW

(71) Applicant: Jonathan Jan, Culver City, CA (US)

(72) Inventor: Jonathan Jan, Culver City, CA (US)

( * ) Notice: Subject to any disclaimer, the term of this patent is extended or adjusted under 35 U.S.C. 154(b) by 0 days.

(21) Appl. No.: 16/682,524

(22) Filed: Nov. 13, 2019

(65) Prior Publication Data

US 2020/0370574 A1    Nov. 26, 2020

Related U.S. Application Data

(60) Provisional application No. 62/850,255, filed on May 20, 2019.

(51) Int. Cl.
    *F15D 1/02*      (2006.01)
(52) U.S. Cl.
    CPC .................................. *F15D 1/025* (2013.01)
(58) Field of Classification Search
    CPC ........................................................ F15D 1/025
    USPC ................................................... 138/44, 114
    See application file for complete search history.

(56) References Cited

U.S. PATENT DOCUMENTS

| | | | | | |
|---|---|---|---|---|---|
| 1,333,986 | A | * | 3/1920 | Lundgaard | F02M 21/00 137/100 |
| 1,567,043 | A | * | 12/1925 | De Boischevalier | F02M 1/00 138/44 |
| 1,641,332 | A | * | 9/1927 | Holley | F02M 21/10 48/189.3 |
| 1,675,349 | A | * | 7/1928 | Heginbottom | F02M 31/08 48/189.2 |
| 2,284,013 | A | * | 5/1942 | Pardoe | G01F 1/44 73/861.63 |
| 2,291,879 | A | * | 8/1942 | Lee | F01M 13/023 123/572 |
| 2,872,810 | A | * | 2/1959 | Shaffer | G01F 1/44 73/861.63 |
| 3,326,041 | A | * | 6/1967 | Reed | G01F 1/44 73/861.64 |
| 3,859,853 | A | * | 1/1975 | Khuzaie | F16L 55/00 73/861.64 |
| 5,529,244 | A | * | 6/1996 | Horvath, Jr. | A01C 23/042 239/318 |
| 8,678,038 | B2 | * | 3/2014 | Adachi | F01N 13/141 138/109 |
| 2017/0254684 | A1 | * | 9/2017 | Betz | G01F 1/44 |

\* cited by examiner

*Primary Examiner* — James F Hook
(74) *Attorney, Agent, or Firm* — Weiss & Moy, P.C.; Jeffrey D. Moy

(57) ABSTRACT

A device to augment air mass flow so an exit airflow will have a higher exit velocity than an inlet airflow has an inner structure having a first open end and a second open end. The inner structure is hollow. The inner structure tapers down from both the first open end and the second open end to a neck area. At least one opening is formed in the neck area. An outer structure has a first open end and a second open end. The outer structure is hollow. A diameter of the first open end of the outer structure and the second open end of the outer structure are approximately equal and allow the inner structure to slide within the outer structure. At least one outer structure opening is formed in a central area of the outer structure.

16 Claims, 2 Drawing Sheets

DEVICE AND METHOD FOR AUGMENTING AIR MASS FLOW

RELATED APPLICATIONS

This patent application is related to U.S. Provisional Application No. 62/850,255 filed May 20, 2019, entitled "DEVICE AND METHOD FOR AUGMENTING AIR MASS FLOW" in the name of Jonathan Jan, and which is incorporated herein by reference in its entirety. The present patent application claims the benefit under 35 U.S.C. § 119(e).

TECHNICAL FIELD

The present application generally relates to renewable energy sources, and, more particularly, to a device that is able to augment air mass flow so that an exit airflow will have a higher exit velocity and hence a higher kinetic energy than an inlet airflow.

BACKGROUND

Renewable energy may be defined as energy produced from sources that do not deplete or be replenished within a human's life time. The most common examples of renewable energies include wind, solar, geothermal, biomass and, hydropower. In an effort to reduce greenhouse gases, there has been an increase demand for the use of renewable energy sources. Using renewable energy can reduce the use of fossil fuels, which are major sources of carbon dioxide emissions.

While renewable energy systems are better for the environment and produce less emissions than conventional energy sources, many of theses sources still face difficulties in being deployed at a large scale. Some of the reasons for these difficulties include, but are not limited to, technological barriers, high start-up capital cost and intermittency challenges.

Wind energy may be defined as the means of harnessing wind and turning it into electricity. Wind mills/turbines take advantage of the kinetic energy or "motion energy" that moves air or wind from one place to another and converts it to electricity. Wind turbines are erected in windy places, so the wind can move the blades of the turbines. These blades rotate a motor, and gears increase the rotations enough to produce electricity. Unfortunately, wind energy has several intrinsic flaws as will be discussed below.

First, wind turbines have wind efficiencies that are problematic. Wind efficiency may be defined as the amount, of kinetic energy in the wind that is converted to mechanical energy and electricity. The laws of physics described by Betz Limit describe the maximum theoretical limit for the amount of kinetic energy in the wind that may be converted to mechanical energy is around 59.6%. Unfortunately, it is not possible for any machine, at present to convert all of the trapped 59.6% of kinetic energy from wind to electricity. There are limits due to the way generators are made and engineered, which further decrease the amount of energy that is finally converted to power. Presently, wind efficiency of most wind turbines is around 20-35%.

Second, wind capacity factors may be defined as the amount of energy produced by a wind turbine as against what it could produce if the wind turbine functioned all the time at peak capacity. Wind capacity factors tend to vary from place to place and is differs during different times of the year, even with the same turbines. Unfortunately, wind speeds are unpredictable and not constant, causing wind turbines to have lower than expected wind capacity factors. While, in the past, the wind capacity factors of wind turbines were around 20-30%, recent technological improvements have raised this number to closer to 50%, However, even with these improvements, wind energy is still not well suited as a base load energy source.

Third, while wind energy is supposed to be better for the environment, wind turbines still pose environmental concerns. The key mechanical and power-generating elements in a wind turbine are a gearbox and the generator to which it is attached. Unfortunately, torque-related stresses on the wind turbine gearbox components, the wind's inherent speed fluctuations and the frequent onslaught of rain, snow, hail, dust and other elements in general, have caused many gearboxes to break down. These breakdowns have caused transmission fluid to leak out and pollute the surrounding soil and water where the wind turbines were located.

Finally, there is some concern about the impact of wind turbines on wildlife, especially birds. The impact of wind energy on birds, which can fly into turbines directly, or indirectly have their habitats degraded by wind development, is complex with various studies contradicting one another. However, recent studies have shown that wind turbines may kill over 500,000 birds just in the United States.

Therefore, it would be desirable to provide an apparatus and method that overcome the above problems.

SUMMARY

In accordance with one embodiment, a device to augment air mass flow so an exit airflow will have a higher exit velocity than an inlet airflow is disclosed. The device has an inner structure having a first open end and a second open end. The inner structure is hollow. The inner structure tapers down from both the first open end and the second open end to a neck area. At least one opening is formed in the neck area. An outer structure has a first open end and a second open end. The outer structure is hollow. A diameter of the first open end of the outer structure and the second open end of the outer structure are approximately equal and allow the inner structure to slide within the outer structure. At least one outer structure opening is formed in a central area of the outer structure.

In accordance with one embodiment, a device to augment air mass flow so an exit airflow will have a higher exit velocity than an inlet airflow is disclosed. The device has an inner structure having a first open end and a second open end. The inner structure is hollow. The inner structure tapers down from both the first open end and the second open end to, a neck area, wherein opposing surfaces of the neck area are non-tapered and parallel. A plurality of openings is formed in the neck area. An outer tube structure has a first open end and a second open end. The outer tube structure is hollow. A diameter of the first open end of the outer tube structure and the second open end of the outer tube structure are approximately equal and allow the inner structure to slide within the outer structure. At least one outer tube structure opening is formed in a central area of the outer tube structure.

In accordance with one embodiment, a device to augment air mass flow so an exit airflow will have a higher exit velocity, than an inlet airflow is disclosed. The device has a hollow inner structure having a first open end and a second open end, a diameter of the first opening and the second opening are approximately equal in size. The inner structure tapers down from both the first open end and the second open end to a neck area, wherein opposing surfaces of the neck area are non-tapered and parallel. The inner structure has a length that is at least twice a diameter of the first opening. A plurality of openings is formed in, the neck area. An outer tube structure has a first open end and a second open end. The outer tube structure is hollow. A diameter of the first open end of the outer tube structure and the second open end of the outer tube structure are approximately equal and allow the inner structure to slide within the outer structure. At least one outer tube structure opening is formed in a central area of the outer tube structure.

BRIEF DESCRIPTION OF THE DRAWINGS

The present application is further detailed with respect to the following drawings. These figures are not intended to limit the scope of the present application but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated, embodiments. It is to be understood, however, that the same or equivalent functions and sequences may be accomplished by different embodiments that are also intended to be encompassed within the spirit and scope of this disclosure.

The present disclosure relates to a device and method for augmenting air mass flow. The device and method allow air flow to enter the device and compress in a neck region of the device. Outside air may be drawn into the device, through vent holes. As the air flow exits the neck region, the air flow expands to an outlet with an increased exit velocity and power output.

Figure 1:
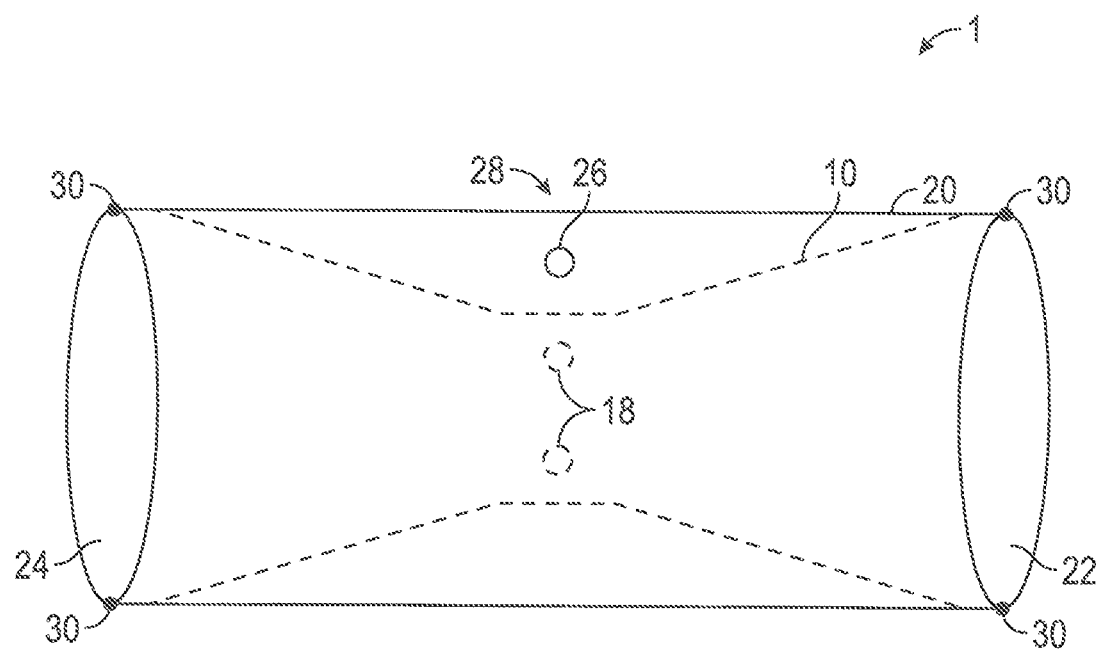
FIG. 1 is a cross-sectional side view of an exemplary embodiment of a device for augmenting air mass flow in accordance with one aspect of the present application.
Figure 2:
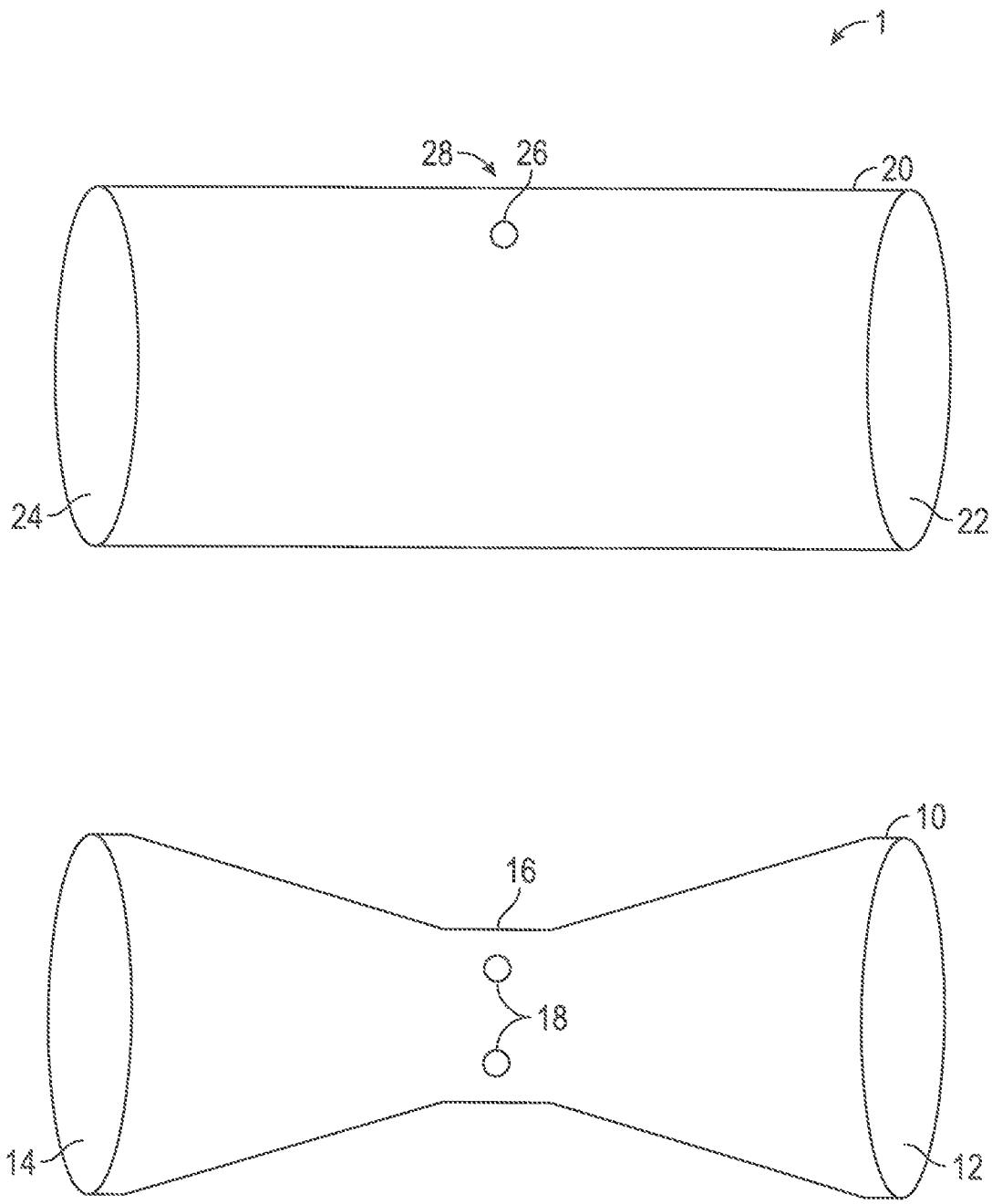
FIG. 2 is an exploded side view of an exemplary embodiment of a device for augmenting air mass flow in accordance with one aspect of the present application.

Referring to FIGS. 1 and 2, a device 1 for augmenting air mass flow may be seen. The device 1 may be used to increase the exit air velocity of air flow into the device and hence power factor by three to six-fold or more. The device 1 has an inner tube 10. The inner tube 10 may be hollow and has a first opening 12 and a second opening 14. In the present embodiment, the diameter of the first opening 12 and the second opening 14 may be approximately the same size. The inner tube 10 may have a length that is no less than twice the diameter, of the first opening 12.

The inner tube 10 may taper down from both the first opening 12 and the second opening 14 to a neck area 16. In accordance with one embodiment, the taper on both ends of the inner tube may mirror one another and may have approximately the same slope. However, while the inner tube 10 in FIG. 1 is shown as being symmetrical, it is just shown as an example and should not be seen in a limiting manner.

The neck area 16 may be anon-tapered tubular section located in a middle area of the inner tube 10 between the first opening 12 and the second opening 14. In the present embodiment, the neck area 16 may flatten out such that a top area 16A of the neck 16 may be parallel to a bottom area 16B of the neck 16.

The neck area 16 may have a diameter smaller than the first opening 12 and the second opening 14 due to the taper. In accordance with one embodiment, the diameter of the neck area 16 may not exceed half the diameter of the first opening 12. These ratios guarantee the optimal compression that cause a vortex when the air mass expands from the neck area 16.

In the embodiment shown, the inner tube 10 with the neck area 16 are shown as being tubular in shape. However, the inner tube 10 and the neck area 16 may take on different geometrical configurations. For example, inner tube 10 and the neck area 16 may be elliptical, trapezoidal having rounded/curved corners, or the like. The aforementioned are given as examples and should not be seen in a limiting manner. The interior of the inner tube 10 should minimize edges to allow less resistant to air flowing therethrough. Thus, if the inner tube 10 and the neck area 16 are trapezoidal, the corners should have rounded/curved corners thereby minimized the edges.

One or more openings 18 may be formed in the neck area 16. The openings 18 may be spaced around a perimeter of the neck area 16. The openings 18 may be used to draw outside air into an interior of the inner tube 10. In accordance with one embodiment, the openings may be equally spaced around the perimeter of the neck area 16.

The device 1 may have an outer tube 20. The outer tube 20 may be hollow and has a first opening 22 and a second opening 24. In the embodiment shown in FIG. 1, the diameter of the first opening 22 and the second opening 24 may be approximately the same size. The diameter of the first opening 22 and the second opening 24 may shaped and sized to allow the inner tube 10 to slide tightly within the outer tube 20 so that there is no gap between the first opening 12 of the inner tube 10 and the first opening 22 of the outer tube 20 and between the second opening 14 of the inner tube 10 and the second opening 24 of the outer tube 20. Connectors 30 may be used to attached an edge of the first opening 12 of the inner tube 10 to an edge of the first opening 22 of the outer tube 20 and to attached an edge of the second opening 14 of the inner tube 10 to, an edge of the second opening 24 of the outer tube 20. The connectors 30 may be used to ensure there is no gap between the first opening 12 of the inner tube 10 and the first opening 22 of the outer tube 20 and between the second opening 14 of the inner tube 10 and the second opening 24 of the outer tube 20. While the FIGs. show the outer tube 20 being approximately a same length as the inner tube 10, this is shown as an example and should not be seen in a limiting manner. The outer tube 20 may be longer than the inner tube 10, with the inner tube being slid within an interior of the outer tube 20. In this embodiment, the diameter of the first opening 22 and the second opening 24 may shaped and sized to allow the inner tube 10 to slide tightly within the outer tube 20 so that there is no gap between the first opening 12 of the inner tube 10 and the interior of the outer tube 20 and between the second opening 14 of the inner tube 10 and the interior of the outer tube 20.

In the embodiment shown in the FIGs., the outer tube 20 is shown as being tubular in shape. However, the outer tube 20 may take on different geometrical configurations. For example, outer tube 20 may be elliptical, trapezoidal having rounded/curved corners, or the like. The aforementioned are given as examples and should not be seen in a limiting manner.

One or more openings 26 may be formed in a central area 28 of the outer tube 20. The central area 28 may located proximate the neck area 16 of the inner tube 10 when the inner tube 10 is positioned within the outer tube 20.

In operation, air flow may enter the device 1 through the first opening 12 of the inner tube 10. The inner tube 10 compresses incident air flow into the neck area 16. Based on the Venturi effect, the velocity of the air flow will increase as it passes through the neck area 16, while the static pressure will decrease. Thus, any gain in kinetic energy the air flow may gain due to the increase in velocity is balanced by a drop-in pressure. The decrease in pressure in the inside of the inner tube 10 may create an imbalance with the ambient air pressure. Based on the imbalance, the openings 18 formed in the neck area 16 draw fresh air from the atmosphere into the device 1 via the openings 26 formed in the outer tube 20.

Based on the Coanda effect, the air flow will tend to stay attached to a convex surface However, by manipulating the curvature of the air flow passage, tore air mass can be brought into the airstream. Experimental data indicated that the exit wind velocity is up almost 250% compared to the inlet wind velocity. The increase in the exit wind velocity allows the exit wind kinetic energy to increase by almost 6 times that of the incident wind.

As may be seen in the chart below, the inlet wind velocity and the exit wind velocity of the device 1 may be seen for various different diameter sizes for the neck area 16. In the test shown below, the diameter of the first opening 12 of the inner tube 10, the first opening 22 of the outer tube 20, the second opening 14 of the inner tube 10 and the second opening 24 of the outer tube 20 are all approximately 6".

| Neck Area Dimeter | Inlet Wind Velocity (MPH) | Exit Wind Velocity (MPH) |
|---|---|---|
| 3" | 38.6 | 66.7 |
| 2½" | 38.6 | 95.3 |
| 1½" | 38.0 | 94.6 |

The device 1 may be used to replace existing wind turbines and some of the problems associated with them. The device 1 could be coupled to existing towers, mast or buildings individually or in arrays. Smaller fans may be installed in the outer tube 20 proximate the second opening 24 to capture the kinetic energy exiting from the device 1 and to rotate a turbine for the generation of electricity.

The device 1 may be used in push-type propulsion. A propeller engine may be installed in the outer tube 20 proximate the second opening 24. The exit airflow may be augmented over 200%. Inert micron-size mass can also be infused into the airflow via the openings, whereby the thrust is further amplified. This propulsion system is much more efficient than open-air propellers. And it, can be adapted to both fix-wing and roto-wing airships.

The device 1 may further be used in a cyclone type pneumatic grinding machine. A cyclone grinder has a chamber where the particulates are colliding with each other, to accomplish size reduction. Cyclone grinders requires high speed, high volume air flow supply. Thus, the device 1 may be used to aid in providing the high speed, high volume air flow supply.

While embodiments of the disclosure have been described in terms of various specific embodiments, those skilled in the art will recognize that the embodiments of the disclosure may be practiced with modifications within the spirit and scope of the claims.

What is claimed is:

1. A device to augment air mass flow so an exit airflow will have a higher exit velocity than an inlet airflow comprising:
   an inner structure having an unobstructed first open end and an unobstructed second open end, the inner structure being hollow, wherein the inner structure tapers down from both the unobstructed first open end and the unobstructed second open end to a neck area, wherein a diameter of the neck area is less than half a diameter of the unobstructed first open end;
   at least one unobstructed opening formed in the neck area drawing outside air into an interior of the inner structure;
   an outer structure having an unobstructed first open end and an unobstructed second open end, the outer structure being hollow, wherein a diameter of the unobstructed first open end of the outer structure and the unobstructed second open end of the outer structure are approximately equal, wherein the diameter of the unobstructed first open end of the outer structure and the unobstructed second open end of the outer structure allow the inner structure to slide within the outer structure; and
   at least one unobstructed outer structure opening formed in a central area of the outer structure;
   wherein airflow enters the unobstructed first open end of the inner structure, a velocity of the airflow increases through the neck area causing a decrease in static pressure, the at least one unobstructed opening formed in the neck area drawing outside air into the interior of the inner structure via the at least one unobstructed outer structure opening formed in the central area of the outer structure allowing an exit airflow to have a higher exit velocity than the airflow entering the unobstructed first open end.

2. The device of claim 1, wherein the inner structure has a length that is at least twice a diameter of the unobstructed first open end.

3. The device of claim 1, wherein the tapers from both the unobstructed first open end and the unobstructed second open end to the neck area mirror one another and have approximately same slopes.

4. The device of claim 1, wherein the neck area is a non-tapered area and opposing surfaces of the neck area are parallel.

5. The device of claim 1, comprising a plurality of unobstructed openings formed in the neck area, wherein the unobstructed openings are spaced around a perimeter of the neck area.

6. The device of claim 1, wherein the outer structure is a tubular structure.

7. The device of claim 1, wherein no gap is formed between the unobstructed first open end of the inner structure and the unobstructed first open end of the outer structure.

8. The device of claim 1, wherein no gap is formed between the unobstructed second open end of the inner structure and the unobstructed second open end of the outer structure.

9. The device of claim 1, comprising:
   a first connector attaching an edge of the unobstructed first open end of the inner structure to an edge of the unobstructed first open end of the outer structure; and
   a second connector attaching an edge of the unobstructed second open end of the inner structure to an edge of the unobstructed second open end of the outer structure.

10. A device to augment air mass flow so an exit airflow will have a higher exit velocity than an inlet airflow comprising:

an inner structure having an unobstructed first open end and an unobstructed second open end, the inner structure being hollow, wherein the inner structure tapers down from both the unobstructed first open end and the unobstructed second open end to a neck area, a diameter of the neck area being less than half a diameter of the unobstructed first open end, wherein opposing surfaces of the neck area are non-tapered and parallel;

a plurality of unobstructed openings formed in the neck area;

an outer tube structure having an unobstructed first open end and an unobstructed second open end, the outer tube structure being hollow, wherein a diameter of the unobstructed first open end of the outer tube structure and the unobstructed second open end of the outer tube structure are approximately equal, wherein the diameter of the unobstructed first open end of the outer structure and the unobstructed second open end of the outer structure allow the inner structure to slide within the outer structure; and at least one unobstructed outer tube structure opening formed in a central area of the outer tube structure;

wherein airflow enters the unobstructed first open end of the inner structure, a velocity of the airflow increases through the neck area causing a decrease in static pressure, the at least one unobstructed opening formed in the neck area drawing outside air into the interior of the inner structure via the at least one unobstructed outer structure opening formed in the central area of the outer structure allowing an exit airflow to have a higher exit velocity than the airflow entering the unobstructed first open end.

11. The device of claim 10, wherein a diameter of the unobstructed first open end and the unobstructed second open end are approximately equal in size.

12. The device of claim 10, wherein the inner structure has a length that is at least twice a diameter of the unobstructed first open end.

13. The device of claim 10, wherein the tapers from both the unobstructed first open end and the unobstructed second open end to the neck area mirror one another and have approximately same slopes.

14. The device of claim 10, wherein the plurality of unobstructed openings are equally spaced around a perimeter of the neck area.

15. The device of claim 10, wherein no gap is formed between the unobstructed first open end of the inner structure and the unobstructed first open end of the outer tube structure and between the unobstructed second open end of the inner structure and the unobstructed second open end of the outer tube structure.

16. The device of claim 10, comprising:

a first connector attaching an edge of the unobstructed first open end of the inner structure to an edge of the unobstructed first open end of the outer tube structure; and a second connector attaching an edge of the unobstructed second open end of the inner structure to an edge of the unobstructed second open end of the outer tube structure.

* * * * *